Jan. 12, 1965  J. H. ANDERSON  3,165,342
MEANS FOR FIXING WHEELS ON SHAFTS
Original Filed Dec. 22, 1960  2 Sheets-Sheet 1
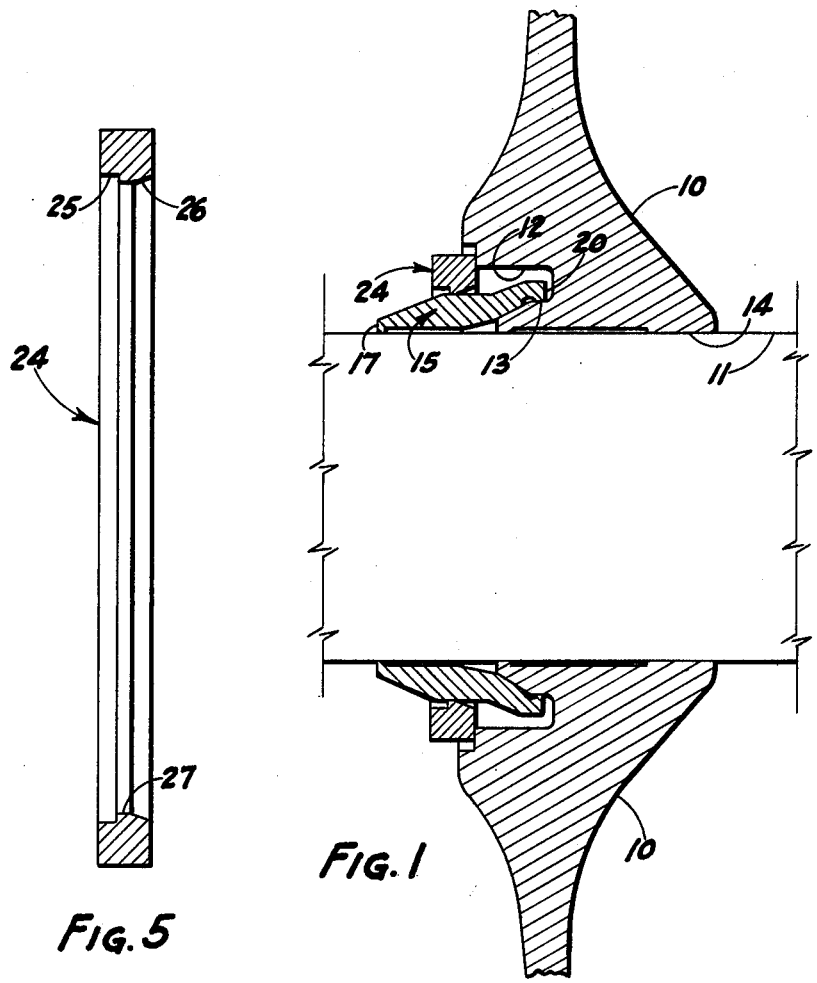
INVENTOR.
JAMES H. ANDERSON
BY
Sidney N. Rosenfeld
ATTORNEY

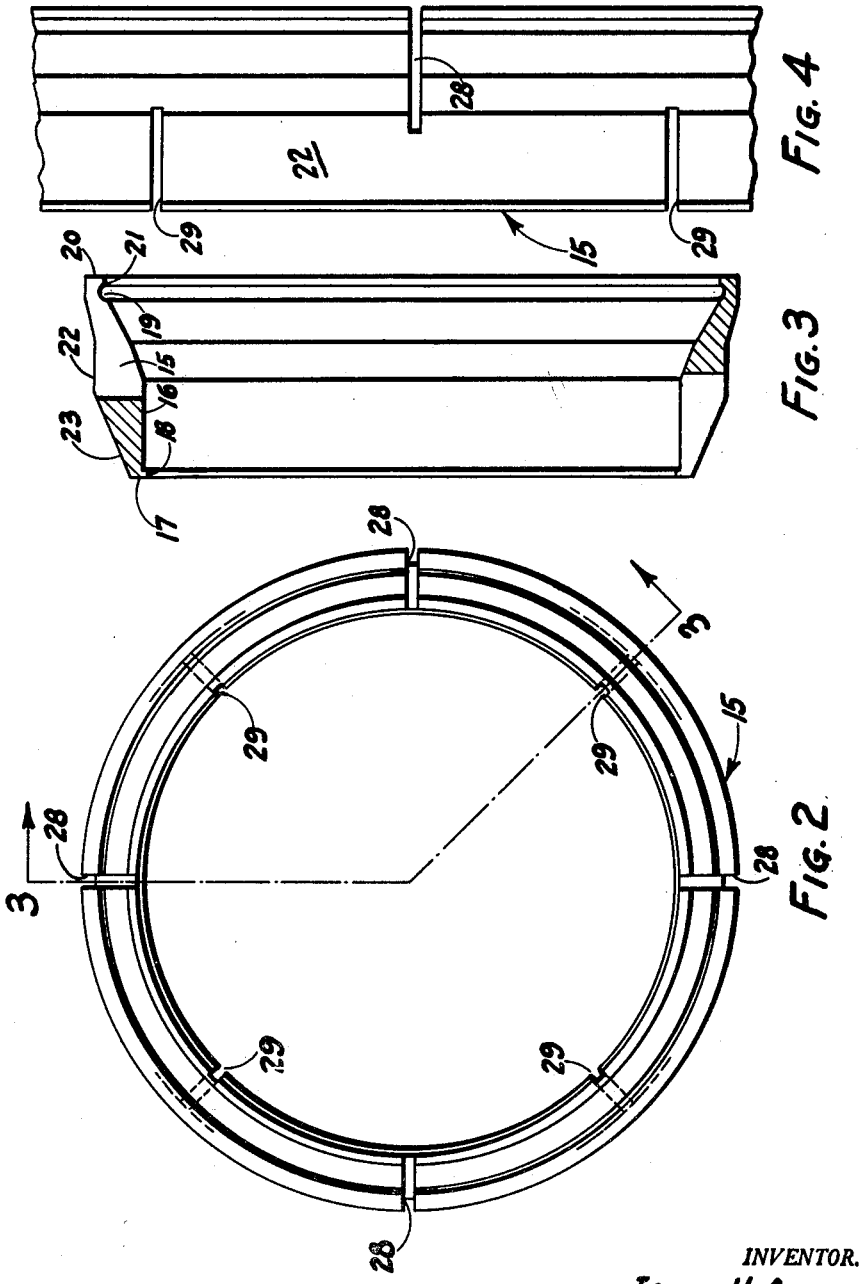

United States Patent Office 3,165,342
Patented Jan. 12, 1965

3,165,342
MEANS FOR FIXING WHEELS ON SHAFTS
James H. Anderson, Spring Garden Township, York County, Pa., assignor to Borg-Warner Corporation, Chicago, Ill., a corporation of Illinois
Continuation of application Ser. No. 77,714, Dec. 22, 1960. This application Mar. 29, 1963, Ser. No. 270,491
7 Claims. (Cl. 287—52)

This invention relates to centrifugal machines and, more particularly, to a means for fixing the rotary impeller or turbine wheels thereof on rotary shafts.

This application is a continuation of application Serial No. 77,714, filed December 22, 1960.

In such centrifugal machines, one way of mounting the aforesaid impeller or turbine wheels on the shafts is to mount them directly thereon, with an interference fit therebetween. The wheels are thus prestressed to resist centrifugal deformation so that the fit may be maintained at high rotational speeds. However, since the wheels heat up to a greater extent and more quickly than the shaft when the machine is put into operation, there is a substantial difference in actual expansion between the hubs of the wheels and the shafts. Experience has shown that when this occurs, the wheels are no longer tightly secured with respect to the shaft.

My invention is directed to a method for maintaining an impeller or turbine wheel on a rotary shaft, which will accommodate the above set-out differential expansion. In addition, the invention provides a means for maintaining the wheel on the shaft without the use of keys or keyways. The absence of a keyway permits the development of the full strength of the wheel. The wheel may be located at any desired point in the length of the shaft.

An object of the invention, therefore, is to provide a means for maintaining an impeller or turbine wheel on a shaft, under all conditions of operation. A further object is to provide a means for maintaining a rotary wheel on a shaft, in which the aforesaid means is elastically deformed to provide for differential expansion of the wheel and shaft, and to reduce centrifugal stresses in the wheel. Yet another object is to provide a means, of the type just above-mentioned, for securing a wheel on a shaft, wherein the wheel may be located at any desired point on the shaft.

The invention consists of the novel constructions, arrangements and devices to be hereinafter described and claimed for carrying out the above-stated objects and such other objects as will appear from the following description of a preferred embodiment of the invention described with reference to the accompanying drawings, in which:

FIG. 1 is a fragmentary view of a portion of a shaft in elevation with a centrifugal wheel in axial section, the wheel being locked on the shaft by a herein-disclosed elastically deformed collet;

FIG. 2 is a side view of the collet taken to a larger scale than FIG. 1;

FIG. 3 is a section on the line line 3—3 of FIG. 2;

FIG. 4 is a development of the collet, showing one suitable method of slotting it in order to increase the elasticity thereof; and FIG. 5 is a sectional view of a ring (shown in FIG. 1), which seats on the collet in order to elastically deform the same, taken to a larger scale than FIG. 1.

Like numerals refer to like parts throughout the several views.

Turning now to the drawings, a rotary wheel 10 is shown mounted on a shaft 11. Wheel 10 has a counterbore 12 therein forming a shoulder 13. Wheel 10 is provided with a bore 14 of sufficient size to receive shaft 11 securely therebetween. However, in the herein-disclosed invention, it is not necessary that there be a pressed fit between the two.

A collet 15 is provided for maintaining wheel 10 on shaft 11. As seen more clearly in FIGS. 2 and 3, collet 15 is of ring-like configuration. At one end thereof, collet 15 is counterbored as at 16 to provide a shaft-engaging rib portion 17 having a bore 18 of a diameter just sufficient to snugly receive shaft 11 therein. At the other end thereof, collet 15 has a counterbore 19 to provide a wheel-retaining rim portion 20 having a bore 21 of a diameter such that it will seat on shoulder 13 of wheel 10. Collet 15 is provided with a ring-supporting deck 22 of any suitable configuration, and a tapered deck approach 23.

It will be apparent that both counterbores 16 and 19 may be omitted and the collet still be effective for its intended purpose. However, it will be appreciated that the design, as shown, is provided for the easier insertion of the shaft 11 within the bore 18 and of shoulder 13 in the bore 21.

A ring 24 is provided to seat on deck 22. In order that ring 24 may be easily applied to deck 22, it is counterbored as shown at 25 and 26, to provide an internal ridge 27. The diameter of internal ridge 27 is somewhat less than that of deck 22. As is apparent from FIG. 5, counterbore 26 is outwardly tapered in order to provide for the easy mounting of ring 25 onto deck 22 and over deck approach 23.

In order to mount a wheel 10 on a shaft 11, collet 15 is mounted on the shaft, the shaft being received within bore 18. The collet 15 is so adjusted with respect to the wheel 10, that shoulder 13 is received within bore 21. Ring 24 is then forced over deck 22, being aided by the tapers of deck approach 23 and counterbore 26, until ridge 27 is properly seated on deck 22. Because of the fact that the diameter of ridge 27 is less than the diameter of deck 22, collet 15 is elastically deformed. This then clamps the shaft 11 within shaft retaining rib portion 17 of the collet 15 and shoulder 13 within wheel retaining rim portion 20. The amount of pressure exerted by collet 15 in maintaining the wheel 10 on shaft 11 may be varied by sundry methods such as, for example, by varying the diameter of internal ridge 27 on ring 24, or varying the thickness of the collet 15.

Further, collect 15 may be provided with a plurality of alternately directed axial slots 28 and 29. From an inspection of FIGS. 2–4, it will be apparent that slots 28 and 29 are provided in order to provide somewhat greater elasticity to the entire collet. It will also be apparent that a section of the collet, bounded by a pair of slots 28 or 29, will require less pressure for deformation than would the entire collet.

It will be seen that I have provided a device well adapted for carrying out the above enumerated objects of the invention. A rotary impeller or turbine wheel may be mounted at any position on a shaft by the herein-disclosed invention, and maintained thereon in spite of stresses set up by the centrifugal action of the machine. Further, the expansion of a wheel and shaft, when heated, will be compensated for by the elasticity of the collet, and the two will be maintained firmly together irrespective of the expansion or contraction thereof.

I wish it to be understood that my invention is not to be limited to the specific constructions and arrangements shown and described, except only insofar as the claims may be so limited, as it will be apparent to those skilled in the art that changes may be made without departing from the principles of the invention.

What is claimed is:

1. The combination with a cylindrical shaft and a wheel having a bore which fits the shaft, said wheel being mounted thereon, and means for maintaining the wheel on the shaft comprising, a shoulder formed in the wheel, a collet having a bore which fits the shaft; said collet being mounted thereon, said collet having a shoulder engaging portion bearing on said wheel shoulder, said collet having a ring seating deck portion, a ring on said deck portion, said ring having a deck engaging portion whose diameter is less than the diameter of said deck portion to thereby form a tight fit with the deck portion, said collet also having a portion engaging said shaft, said deck portion being on a portion of the collet which is axially intermediate the said shoulder engaging collet portion and the said shaft engaging collet portion with said intermediate collet portion being radially spaced from said shaft, whereby the collet is deformed.

2. The combination of claim 1 wherein said collet is of elastic material and axially slotted to increase the elasticity thereof.

3. The combination with a cylindrical shaft and a wheel having a bore which fits the shaft, the wheel being mounted on the shaft, and means for maintaining the wheel on the shaft comprising, a shoulder formed in the wheel and encircling the shaft, a collet of elastic material having a bore which fits the shaft, the collet encircling and being mounted on the shaft and having a portion bearing thereon, the collet having a shoulder engaging portion bearing on said wheel shoulder; and a ring seated on said collet intermediate the latter's shaft engaging portion and shoulder engaging portion, all portions of the collet intermediate its shaft and shoulder engaging portions being radially spaced from said shaft, said ring having a bore of a diameter less than the said intermediate ring engaging collet portion to thereby form a tight fit with the collet, whereby the collet is elastically deformed.

4. The combination of claim 3, wherein said collet is provided with a plurality of alternately disposed axially directed slots to increase the elasticity thereof.

5. The combination with a cylindrical shaft and a wheel having a bore which fits the shaft, the wheel being mounted on the shaft; and means for maintaining the wheel on the shaft comprising, a circumferential shoulder formed in the wheel; a collet of elastic material with a bore fitting the shaft, the collet being mounted on the shaft, one end of the collet comprising a wheel retaining portion bearing on said circumferential wheel shoulder, a ring engaging deck portion on the collet, a ring seated on said deck portion, said ring having a deck engaging bore portion of a diameter less than the diameter of said ring deck portion to thereby form a tight fit with the collet, the other end of the collet engaging the said shaft, said deck portion being situated on a portion of the collet which is axially between the ends of the collet with the collet portions between said ends being radially spaced from said shaft, whereby the collet is elastically deformed.

6. The combination as set out in claim 5 wherein said ring is counterbored to provide an outwardly flaring taper, whereby said ring may be more easily mounted on said deck portion of the collet.

7. The combination as set out in claim 6 wherein said collet is provided with a tapered deck approach between the said deck portion and the said shaft engaging portion for easier insertion of said ring thereover.

No references cited.